M. FISHER.
VEHICLE WHEEL SPINDLE.
APPLICATION FILED AUG. 2, 1921.

1,401,900.

Patented Dec. 27, 1921.

Inventor
Mose Fisher
By G. Munie Talbert
Attorney

UNITED STATES PATENT OFFICE.

MOSE FISHER, OF PLAIN, NEW MEXICO.

VEHICLE-WHEEL SPINDLE.

1,401,900.   Specification of Letters Patent.   Patented Dec. 27, 1921.

Application filed August 2, 1921. Serial No. 489,252.

*To all whom it may concern:*

Be it known that I, MOSE FISHER, a citizen of the United States of America, residing at Plain, in the county of Quay and State of New Mexico, have invented new and useful Improvements in Vehicle-Wheel Spindles, of which the following is a specification.

The object of the invention is to provide a vehicle wheel spindle having means for compensating for the endwise wear of the boxing to eliminate the lost motion incident to such wear, and more particularly to provide a spindle which as initially constructed is provided with consecutively movable spacing means which permit of increasing the degree of adjustment of the spindle nut as the boxing wears at its extremities to maintain a correspondence in the length of the bearing surface of the spindle to correspond with that of the boxing; and with this object in view the invention consists in a construction and combination of parts of which a preferred embodiment is shown in the accompanying drawings, wherein:—

Figure 1:
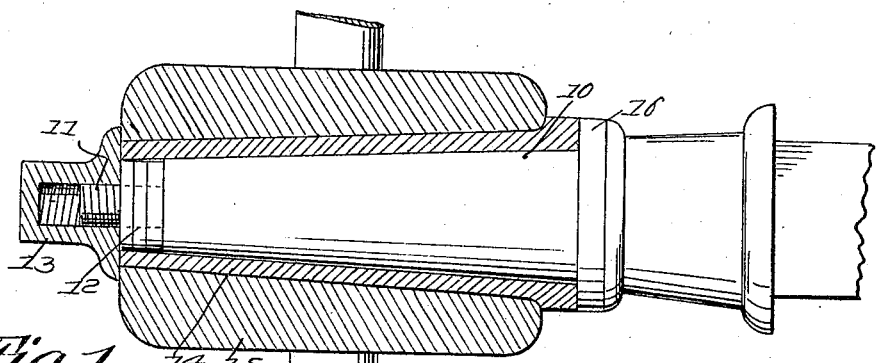
Figure 1 is a side view of a spindle having a construction embodying the invention arranged in operative position in a wheel hub held in place by a conventional form of axle nut, the hub and nut being shown in section.
Figure 2:
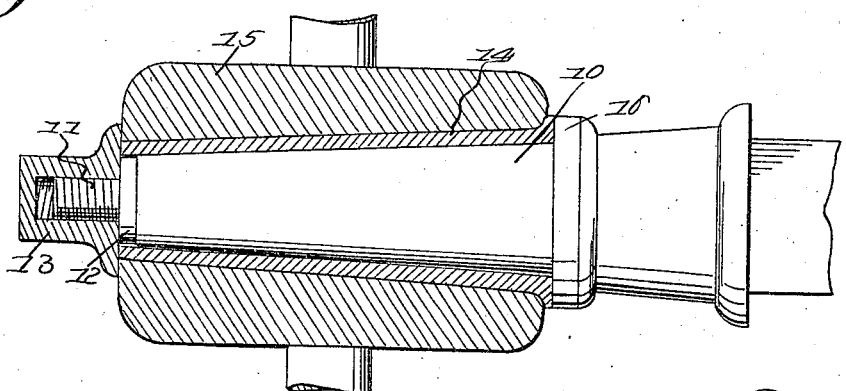
Fig. 2 is a similar view showing an adjusted arrangement of the parts incident to the wear endwise of the spindle boxing.
Figure 3:
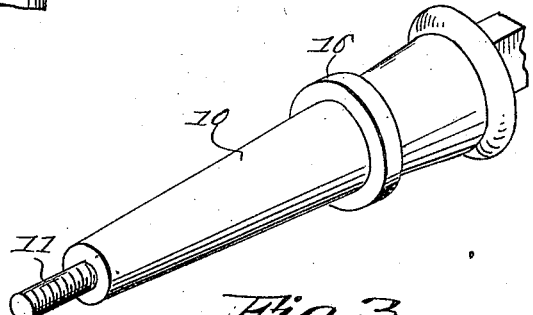
Figs. 3 and 4 are detail views respectively of the spindle showing the spacing rings or elements respectively in the normal, original or operative position and detached from the spindle.
Figure 4:

The invention consists essentially in providing the spindle 10 which may be of the ordinary or any conventional type with a terminal threaded nut receiving extension 11 of the usual form and type, the outer end of the bearing or body portion of the spindle consisting of a plurality of removable annular spacing elements or rings 12 interiorly threaded and engaged with the threaded extension 11 which is of greater length than in the ordinary practice to provide initially or when the spindle is constructed for holding the desired number of said spacers or rings while exposing a sufficient length beyond the outermost spacer or ring for the reception of the usual spindle nut 13 for maintaining the boxing 14 of the hub 15 in its proper position on the body portion of the spindle.

As the collar 16 on the outer end of the boxing becomes worn by friction and the tendency of the boxing to move endwise on the spindle the spacers or rings may successively be removed to permit of the boxing being forced inwardly by a corresponding inward adjustment of the spindle nut, and to facilitate the removal of the spacers or rings they may be provided as shown with punch seats 17 adapting them to be turned and thereby unscrewed from the threaded portion of the spindle.

By reason of this construction it is possible to maintain a wheel hub, boxing or sleeve in proper relation with the bearing portion of the spindle indefinitely and prevent the rattling incident to the lost motion or longitudinal movement of the boxing on the spindle.

Having described the invention, what is claimed as new and useful is:—

1. A vehicle spindle having a bearing or body portion consisting at its outer end of a plurality of successively removable annular spacers or rings fitted upon the threaded nut receiving extension of the spindle and interiorly threaded for engagement therewith.

2. A vehicle spindle having a bearing or body portion consisting at its outer end of a plurality of successively removable annular spacers or rings fitted upon the threaded nut receiving extension of the spindle and interiorly threaded for engagement therewith and provided with punch seats for facilitating the successive removal thereof.

In testimony whereof he affixes his signature.

MOSE FISHER.